March 24, 1953 F. A. ROWLAND 2,632,589
BAG FILLING AND WEIGHING MACHINERY
Filed Aug. 23, 1951 8 Sheets-Sheet 1

FIG. I.

Inventor:
Frank A. Rowland,
By:
Smith, Michael and Gardiner,
Attorneys.

March 24, 1953 F. A. ROWLAND 2,632,589
BAG FILLING AND WEIGHING MACHINERY
Filed Aug. 23, 1951 8 Sheets-Sheet 2

Inventor:-
Frank A. Rowland,
By
Smith, Michael and Gardiner
Attorneys.

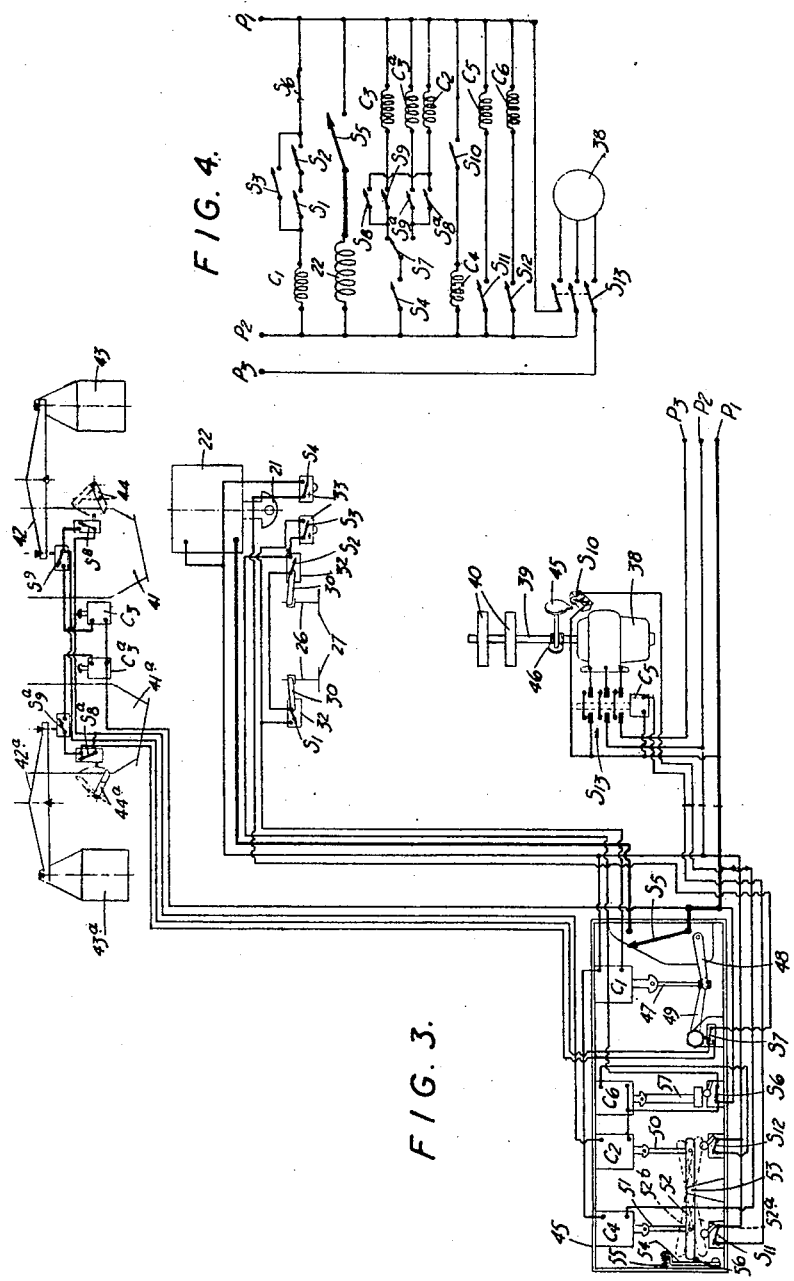

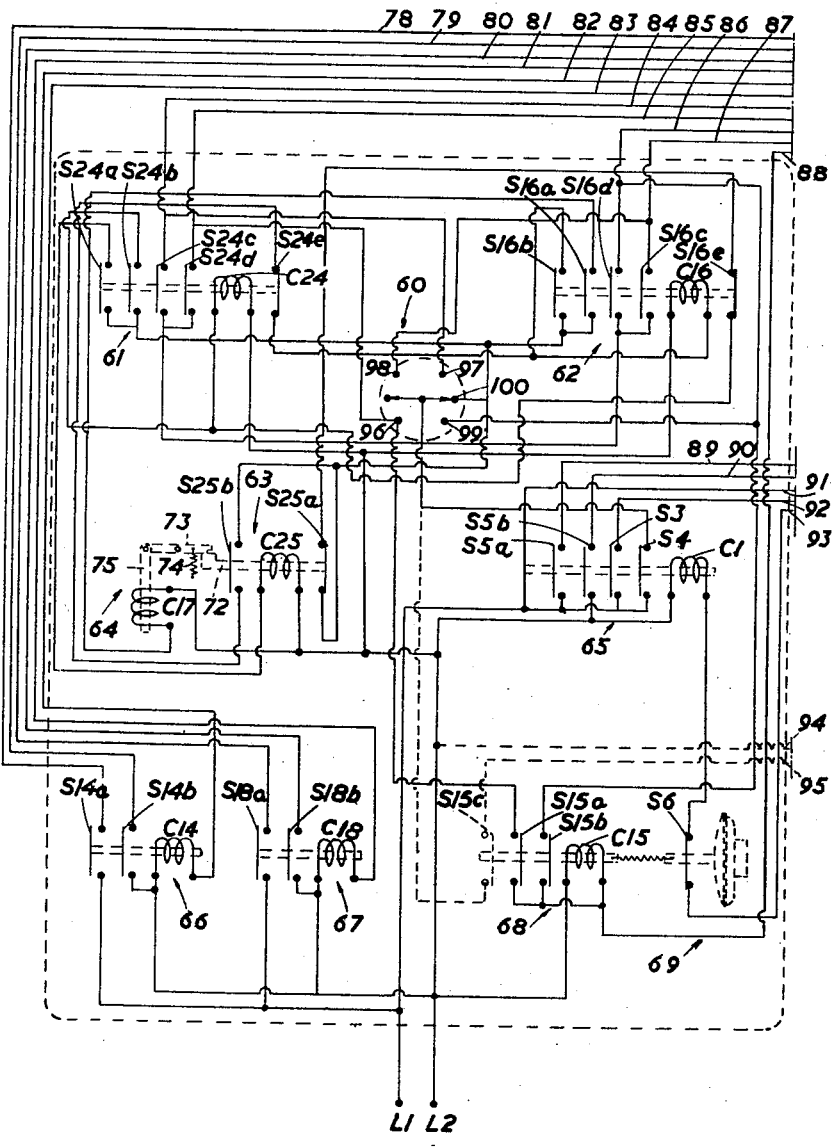

March 24, 1953      F. A. ROWLAND      2,632,589
BAG FILLING AND WEIGHING MACHINERY
Filed Aug. 23, 1951      8 Sheets-Sheet 5
FIG.5b.
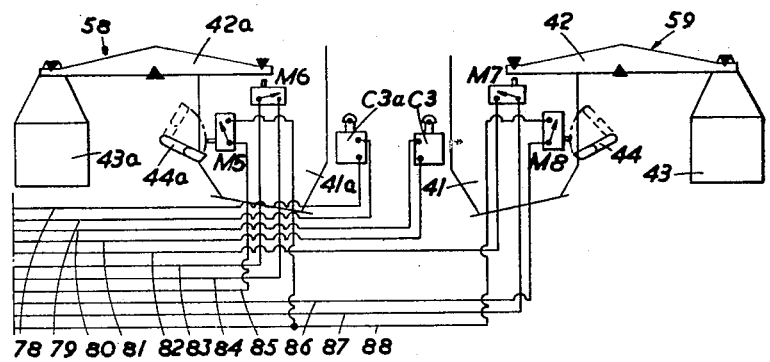
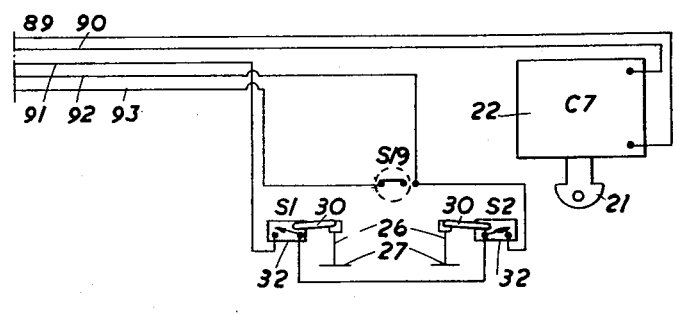
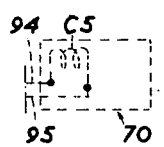
Inventor:
Frank A. Rowland,
By Smith, Michael and Gardiner,
Attorneys March 24, 1953 F. A. ROWLAND 2,632,589
BAG FILLING AND WEIGHING MACHINERY
Filed Aug. 23, 1951 8 Sheets-Sheet 6

Inventor:
Frank A. Rowland,
By
Smith, Michael and Gardiner,
Attorneys

March 24, 1953  F. A. ROWLAND  2,632,589
BAG FILLING AND WEIGHING MACHINERY
Filed Aug. 23, 1951  8 Sheets-Sheet 7
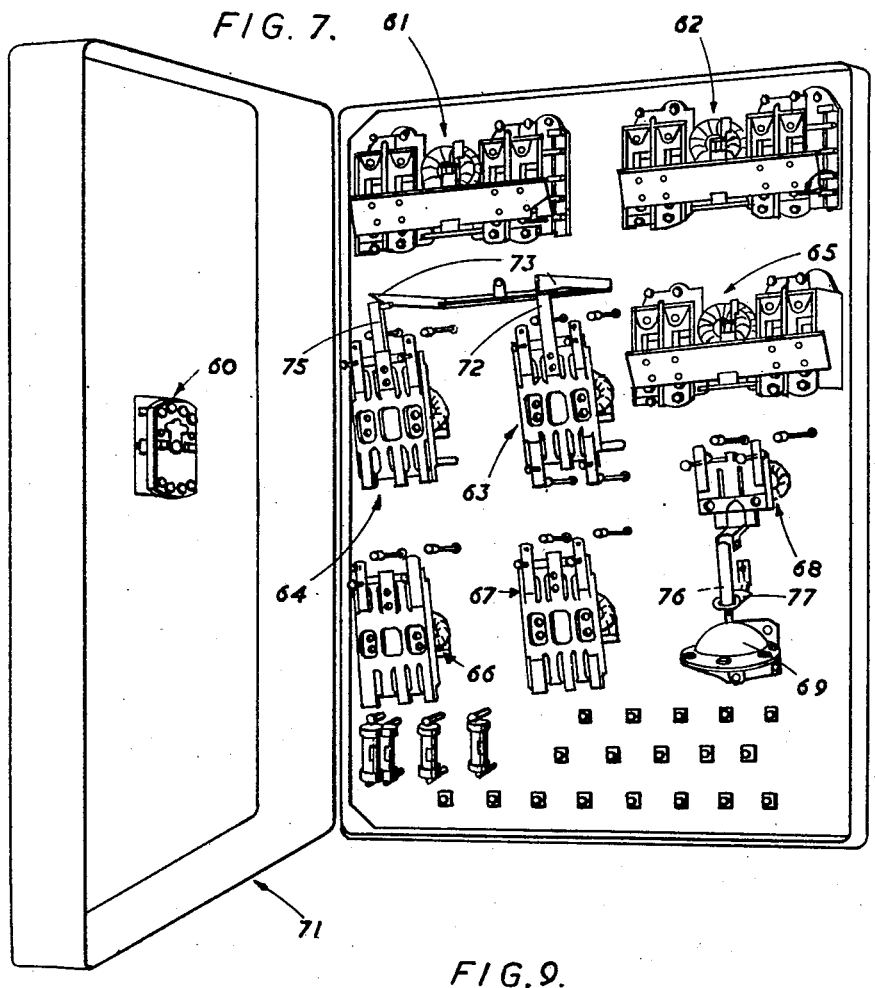
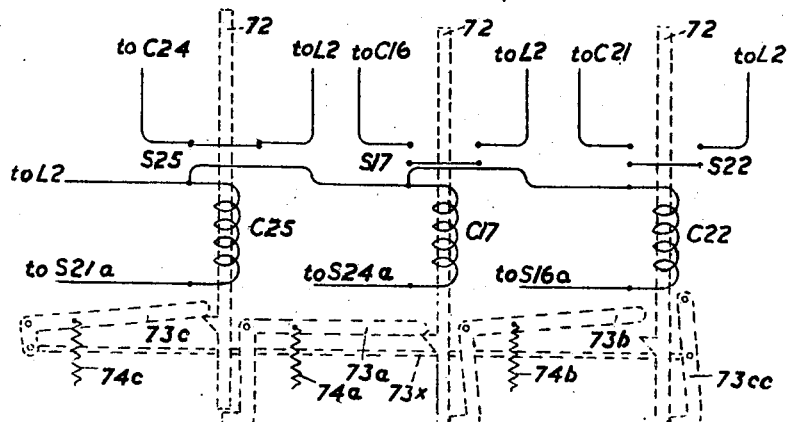
Inventor:
Frank A. Rowland,
By
Smith, Michael and Gardiner,
Attorneys.

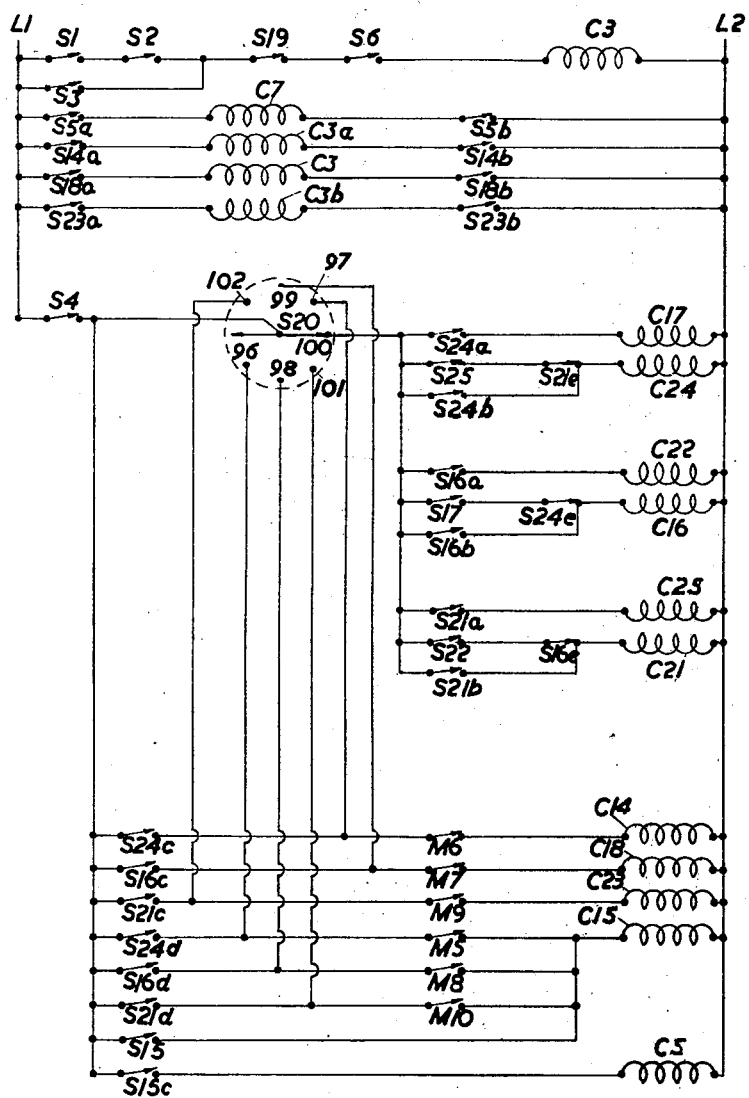

Patented Mar. 24, 1953

2,632,589

UNITED STATES PATENT OFFICE 2,632,589

BAG FILLING AND WEIGHING MACHINERY

Frank Arnold Rowland, Maidstone, England, assignor to Medway Paper Sacks Limited, London, England, a British company Application August 23, 1951, Serial No. 243,317
In Great Britain June 24, 1949

24 Claims. (Cl. 226—55)

The present invention relates to heavy duty bag-filling machines of the kind in which open-mouthed bags are presented in succession by hand to a single stationary filling spout, and this application for patent is a continuation-in-part of application Serial No. 133,818 filed December 19, 1949, and now abandoned.

The present invention relates more particularly to machines comprising bag-clamping means, which are operated, e. g. through a toggle-linkage, by an electrically controlled power device, such as an electromagnet, or like device, to clamp the edges of the bag walls and support the bag, a herein called "bag-feeler" switch or switches closable by upward movement of a plunger or plungers engageable edgewise by the bag walls surrounding the open end of the bag to energise the power device and cause the clamping means to clamp the edges of said bag walls and thus support the bag, and means actuated on or by the clamping movement of the power device for maintaining the controlling circuit closed to prevent premature release of the bag.

An object of the invention is to provide, in a machine of the character defined above, fully automatic means for performing, in their correct sequence and with correct timing, the various operations of the bag-filling cycle, viz. clamping the bag on the filling spout, locking the bag-clamping means, discharging a predetermined amount of material into the bag through the spout, settling the contents of the bag, if desired, by the use of a slapper of any preferred or conventional construction, and releasing the bag from the spout, such cycle being initiated by presentation of the empty bag by hand to the spout, after which the operator has no more to do until the next cycle has to be initiated by the application of a new bag to the spout.

Another object of the invention is to enable a single operative to manage the machine unaided.

Further objects of the invention, applicable to machines having one or more weighing and dispensing units or scale units of known type, include the fully automatic control of the scale unit or units causing it or them to work in synchronism with the bag-clamping and releasing cycle, and, when two or more such units are installed, in alternation or rotation, so that while one unit is being discharged the other or the next in cyclical order is being filled. These further objects also include the provision of means enabling the operator of a machine with two or more scale units to revert at will to single-unit working with either or any one of the units as selected by the operator, thus enabling defects in the weighing and dispensing system and its control means to be attended to without necessitating complete stoppage of the machine.

The manner in which these objects are attained, and such others as may hereinafter appear, will be evident from the following description with reference to the accompanying drawings illustrating two embodiments of the invention, the several figures of the drawing showing installations each having two scale-units, and a modification of one of them applicable to an installation with three scale units, such description and drawings being by way of example only and implying no limitation of the scope of the invention as defined in the hereto appended claims. In the drawings, Figure 1 is an end elevation of the spout portion of the machine;

Figure 3 is a pictorial circuit diagram;

Figure 4 is a theoretical circuit diagram;

Figure 6:
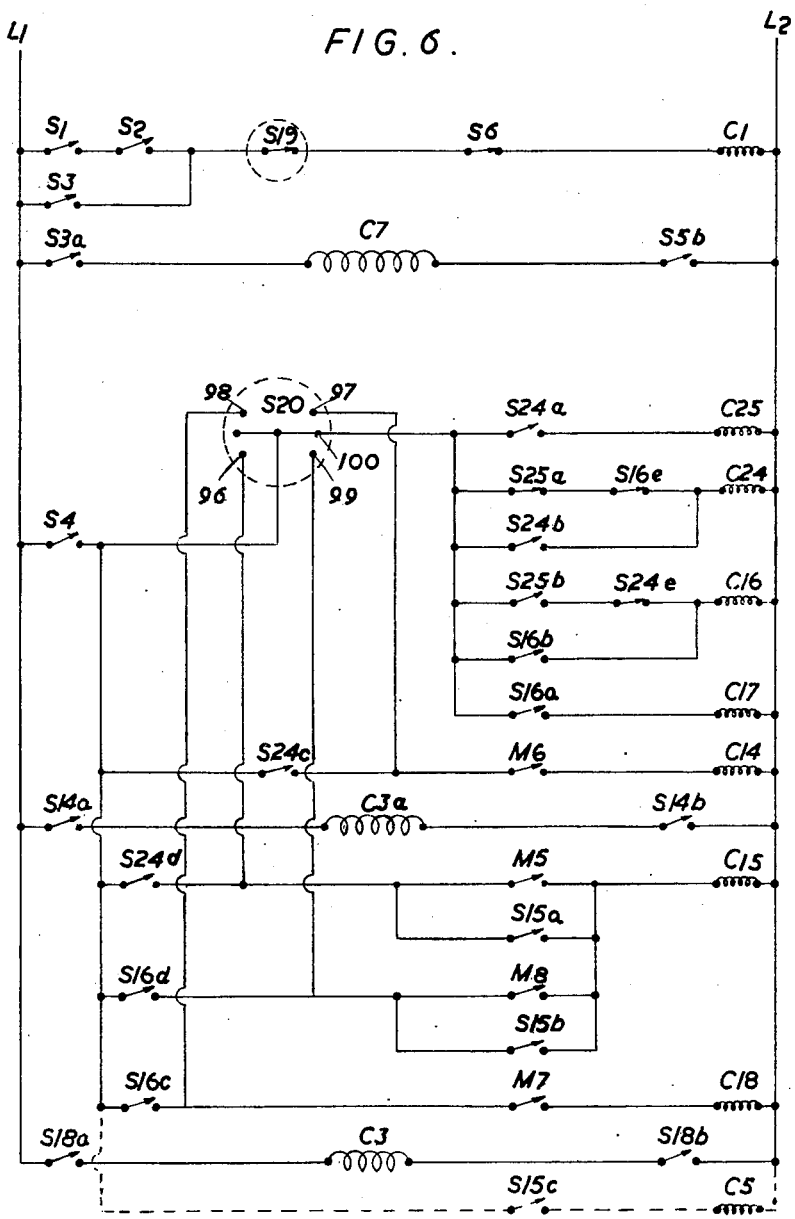

Figure 5 (which for convenience is divided into two parts, Figures 5a and 5b) and Figure 6 are, respectively, pictorial and theoretical circuit diagrams, similar to Figures 3 and 4, of a second embodiment of the invention;

Figure 7 is a perspective view of the control panel of the embodiment according to Figures 5 and 6;

Figure 8 is a theoretical circuit diagram similar to Figure 6, modified for controlling an installation having three scale units; and Figure 9 is a fragmentary pictorial circuit diagram illustrating a latched relay for the circuit of Figure 8.

Figure 1:
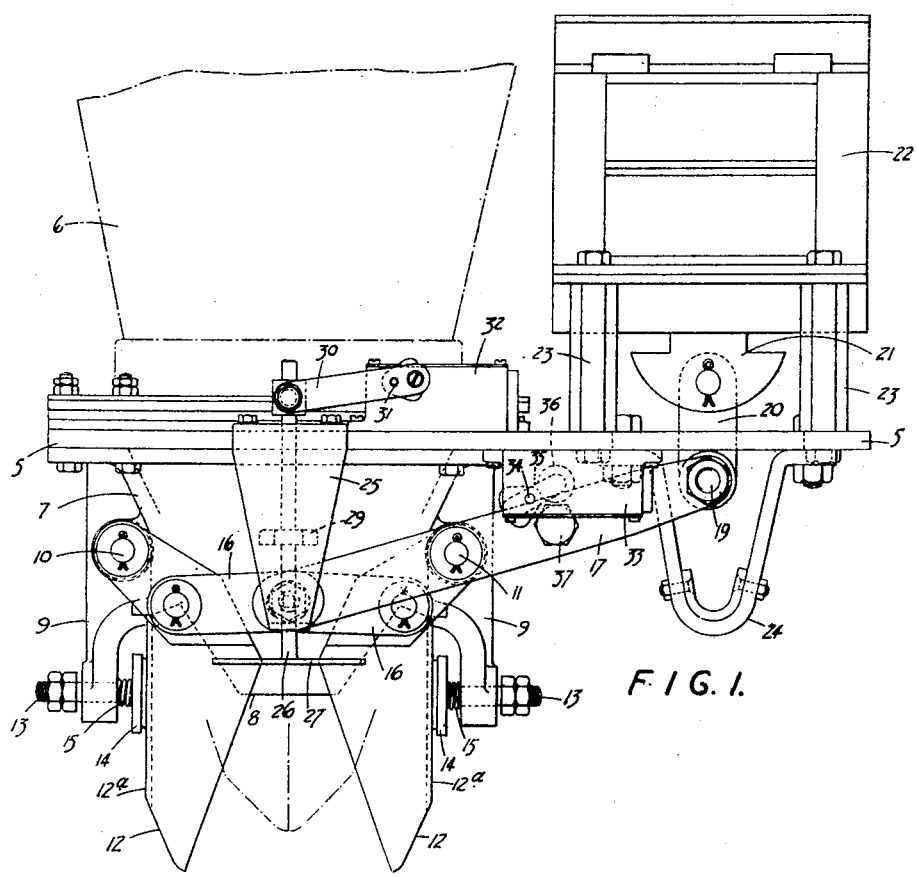

The apparatus illustrated in Figure 1 comprises a fixed base-plate 5, to which is secured a hopper 6 terminating in a spout 7, the discharge mouth of which is indicated at 8. The spout 7 includes integral side brackets 9, supporting hinge pins 10, 11 on which are pivoted a pair of jaws 12 embracing the spout 7. These jaws 12 are shown in Figure 1 in the open position in full lines and in the closed position in chain-dotted lines. The brackets 9 also support horizontally slidable studs 13 carrying vertical pads 14 loaded by springs 15 to engage the flat outer faces 12ª of the jaws 12 when the latter are in open position.

The jaws 12 are connected by pin-jointed toggle linkages 16 with a pair of levers 17 fulcrumed on the hinge pin 11 and connected to one another by bars 18, 19, the latter being connected by means of a pin-jointed link 20 to the armature 21 of an electromagnet 22 supported on pillars 23 secured to the base-plate 5. When the electromagnet 22 is energised, the armature 21 is raised and opens the jaws 12, as shown in full lines in Figure 1. When the current is cut off from the electromagnet the jaws are returned to the closed position either by the unbalanced weight of the armature alone or with the assistance of springs (not shown). The descent of the bar 19 is limited by stirrups 24 secured to the base-plate 5, thus relieving the jaws 12 from shock when closing.

The base-plate 5 further supports depending brackets 25, one at each end of the spout, in which brackets two plungers 26 are vertically slidable. Each plunger 26 has a horizontal flat plate 27 at its lower end, and the weight of the plunger 26 and plate 27 is supported by a spring 28 resting on the bracket 25 and engaging an abutment 29 secured to the plunger 26. The upper end of each plunger 26 is connected to a lever 30 mounted on a shaft 31 journalled in a switch-box 32 mounted on the base-plate 5, and housing a "bag-feeler" switch ($S_1$, $S_2$, Figures 3 and 4) operated by shaft 31. When the plunger 26 is raised, the said bag-feeler switch is closed.

On the underside of the base-plate 5 are mounted two switch-boxes 33, each containing a switch which is closed when the jaws 12 open by means of a shaft 34 journalled in the box 33 and carrying an external lever 35 provided with a roller 36 engaged by one of a pair of studs 37, by which the levers 17 are secured to the bar 18. One of the two switches housed in the boxes 33 is the "locking" switch ($S_3$, Figures 3 and 4) and the other is the "safety" switch ($S_4$, Figures 3 and 4), hereinafter referred to. The actual construction of these switches and of the bag-feeler switches housed in the switch-boxes 32 is not illustrated herein as encased switches suitable for the purpose are a common article of commerce and the construction and operation of such switches are well known to those skilled in the art.

The operation of the apparatus is as follows:—on presenting the mouth of an empty bag to the spout with the mouth held open, the closed jaws 12 enter the bag mouth. On raising the bag, the edges of its mouth opening meet the plates 27 and raise the plungers 26, thus closing the bag-feeler switches ($S_1$, $S_2$, Figures 3 and 4). Since the plates 27 are located one at each side of the spout, the bag must be presented squarely to the spout to ensure closure of both of said bag-feeler switches. As hereafter explained, closure of both of said bag-feeler switches causes the electromagnet 22 to be energised and to open the jaws 12, thereby causing the side walls of the bag mouth to be frictionally clamped between the flat faces $12^a$ of the jaws 12 and the spring-loaded pads 14. At the same time, the movement of the levers 17 and bar 18 causes the studs 37 to operate the levers 35 and close the locking and safety switches ($S_3$, $S_4$, Figures 3 and 4). As hereafter explained, closure of said locking switch ensures that the electromagnet 22 remains energised and that the bag remains clamped on the spout until a release switch hereinafter referred to is opened.

The constructional details of the remainder of the machine are not illustrated, since, for the most part, components of known construction are made use of, the novelty of the arrangement of my present invention residing primarily in the electrical circuits by which the several components are interconnected and automatically controlled, as illustrated in the accompanying pictorial and theoretical circuit diagrams (Figures 3 and 4).

Figure 2:
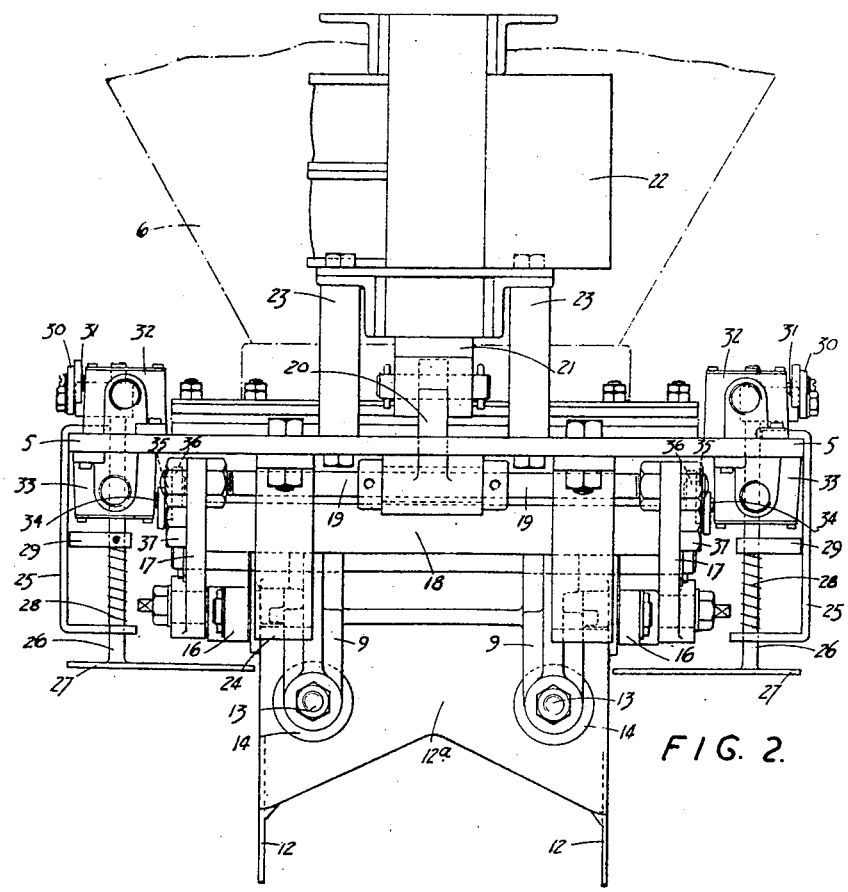
Figure 2 is a side elevation of the same.

These circuit diagrams relate to a machine embodying apparatus as illustrated in Figures 1 and 2, of which the electromagnet 22 and its armature 21, the plungers 26, plates 27, levers 30 and switch-boxes 32, 33 are shown diagrammatically in Figure 3. Figure 3 also shows diagrammatically the following further components of the machine, viz. a slapper motor 38 whose shaft 39 drives slappers 40 of any preferred or conventional construction, and net weighing apparatus having two similar weighing and dispensing units each comprising a scale-pan 41 or $41^a$, balance beam 42 or $42^a$, and counterweight 43 or $43^a$. The use of slappers 40 for settling the contents of the bag is optional in so far as the present invention is concerned. Such slappers per se are old and well known in the art and as such form no part of my present invention, and usually consist of a shaft driven by a slapper motor such as shaft 39 and slapper motor 38, and carrying at least one radially-extending arm to the outer or free end of which is rigidly attached a piece of flexible sheet material, such as a piece of a sheet of rubber or the like. In the operation of such devices, the shaft of the motor is mounted in such a position with respect to the bag that as the shaft rotates, the piece of flexible sheet material strikes the bag at each revolution of the shaft and arm, the rigid part of the arm revolving clear of the bag by a sufficient distance to permit the piece of flexible sheet material to bend or flex and to slide past the bag after it strikes the bag to settle the contents thereof. The scale-pans 41 or $41^a$ have self-closing bottom doors which are diametrically represented in Figure 3 by the elements 44, $44^a$, the open position of which is indicated in full lines and the closed position in chain-dotted lines in said figure. In Figure 3 there is also shown a control box 45 containing a number of switches and solenoid-operated switch-actuating mechanism hereinafter referred to.

The electrical system comprises a number of switches which are designated by the letter S with appropriate suffixes, and solenoids or electromagnets designated by the letter C with appropriate suffixes, with the exception of the electromagnet shown in Figures 1 and 2 which is designated by the reference 22. A three-phase supply is employed, the phases of which are designated $P_1$, $P_2$, $P_3$, of which the third phase $P_3$ is only made use of by the slapper motor 38 which is of the constant speed three-phase type so that a predetermined number of revolutions of said motor is equivalent to a predetermined time interval. The switches in the system comprise the two bag-feeler switches $S_1$, $S_2$ which are housed in the switch boxes 32 and are operated by the plungers 26 and levers 30 as described with reference to Figures 1 and 2, the locking switch $S_3$ and safety switch $S_4$ housed in the switch-boxes 33 and operated by the armature 21 of the electromagnet 22 in the manner described above with reference to Figures 1 and 2, the main switch $S_5$ of the electromagnet 22, a bag release switch $S_6$, selector switch $S_7$, slapper start switches $S_8$, $S_8^a$, dump switches $S_9$, $S_9^a$, a slapper stop switch $S_{10}$, a slapper motor relay switch $S_{11}$, a bag release relay switch $S_{12}$ and a three-pole slapper motor switch $S_{13}$. The solenoids or electromagnets comprise the electromagnet 22, hereinafter referred to as the main electromagnet, which operates the bag-clamping jaws 12 as described with reference to Figures 1 and 2, a main electromagnet relay solenoid $C_1$, a slapper start solenoid $C_2$, scale-pan dump solenoids $C_3$, $C_3^a$, a slapper motor stop solenoid $C_4$, a slapper motor starter solenoid $C_5$ and a bag release relay solenoid $C_6$.

The electrical connections of these switches and solenoids are shown in Figure 4 and their mechanical connections in Figure 3. The electromagnet 22 and solenoids $C_1$ to $C_6$ are each connected across the mains from phase $P_1$ to phase $P_2$ and are switched as follows: the electromagnet 22 is in circuit with switch $S_5$; the circuit of solenoid $C_1$ contains switch $S_6$ and has two parallel branches, one containing switch $S_3$ and the other switches $S_1$ and $S_2$ in series; solenoids $C_2$, $C_3$, $C_3^a$ are connected to phase $P_1$; the circuit of solenoid $C_2$ has two parallel branches respectively containing switches $S_8$ and $S_8^a$, and the circuits of solenoids $C_3$ and $C_3^a$ respectively contain switches $S_9$ and $S_9^a$; switches $S_8$ and $S_9$ are paralleled onto one pole of the selector switch $S_7$ and switches $S_8^a$ and $S_9^a$ are paralleled onto the other pole of the selector switch $S_7$, the latter being connected to phase $P_2$ through switch $S_4$; the circuit of solenoid $C_4$ contains switch $S_{10}$; the circuit of solenoid $C_5$ contains switch $S_{11}$; and the circuit of solenoid $C_6$ contains switch $S_{12}$.

The three pole switch $S_{13}$ connects the three terminals of the slapper motor to the three phases $P_1$, $P_2$ and $P_3$.

The armature of solenoid $C_1$ is connected by a link 47 to a lever 48, which operates the main electromagnet switch $S_5$, and to a lever 49 which operates the selector switch $S_7$ in such a way that at each energisation of the solenoid for closing switch $S_5$ the selector switch is thrown over from one of its poles to the other giving alternate selection of the circuit containing switches $S_8$, $S_9$ and solenoid $C_3$ and of the circuit containing switches $S_8^a$, $S_9^a$ and solenoid $C_3^a$. The armature of solenoids $C_3$ and $C_3^a$ respectively operate the bottom doors 44, 44$^a$ of the scale-pans 41, 41$^a$ so as to open the doors and dump the contents of the pans, when the solenoids are energised. The armature of solenoid $C_5$ closes the slapper motor switch $S_{13}$ when the solenoid is energised; and the armature of solenoid $C_6$ is connected to a member 57 which opens switch $S_6$ when the solenoid is energised.

The armatures of solenoids $C_2$, $C_4$ are respectively connected by links 50, 51 with opposite ends of a rocking bar 52 fulcrumed at 53, one end of which is engageable by a spring-lock diagrammatically represented as comprising a latch bar 54 loaded by a spring 55 and having a latch 56 engageable with the rocking bar 52. The latter operates switches $S_{11}$ and $S_{12}$ and is shown in full lines in the neutral position in which both switches $S_{11}$ and $S_{12}$ are open. When solenoid $C_2$ is energised, the bar 52 is rocked into position 52$^a$ (shown in dotted lines in Figure 3) and closes switch $S_{11}$, switch $S_{12}$ remaining open. To reach this position the bar 52 springs under the latch 56 which retains it when solenoid $C_2$ is de-energised until solenoid $C_4$ is energised. This springs the bar 52 out of the lock and throws into position 52$^b$ (shown in dotted lines in Figure 3) closing switch $S_{12}$ and allowing switch $S_{11}$ to open. When solenoid $C_4$ is in turn de-energised, the bar 52 returns to neutral allowing switch $S_{12}$ to open again.

Switches $S_8$ and $S_8^a$ are respectively operated by the bottom doors 44, 44$^a$ of the scale-pans 41, 41$^a$ so as to be momentarily tripped to closed position when said doors close, and switches $S_9$, $S_9^a$ are closed by the balance beam 42, 42$^a$ when the scale-pans 41, 41$^a$, respectively, descend. The operation of switches $S_1$, $S_2$, $S_3$ and $S_4$ has already been described.

A cam 45 is driven by the shaft 39 of the slapper motor 38 through gearing 46 and momentarily closes switch $S_{10}$ on the completion of a predetermined number of revolutions by the slapper motor, the latter being started just after a lobe of the cam has passed the switch $S_{10}$. In the diagrammatic representation (Figure 3), the cam 45 is shown as single-lobed, but a two- or more-lobed cam may be used depending on the ratio of the gearing 46.

The sequence of operations is as follows:

Initially all switches are open except the bag-release switch $S_6$, the selector switch $S_7$, which is closed on one of its contacts for selecting, say, the circuits containing switches $S_8$, $S_9$ and solenoid $C_3$ for closure (see Figures 3 and 4). One or both of the dump switches $S_9$, $S_9^a$, may also be closed depending on whether the scale-pans 41, 41$^a$ are full or empty. If both are filled, which may be assumed to be the case when the machine is started up, both switches $S_9$, $S_9^a$ will be closed.

On presenting an empty bag squarely to the spout 7 (Figures 1 and 2), the plungers 26 are raised thus closing the bag-feeler switches $S_1$, $S_2$ as already explained and completing the circuit through the release switch $S_6$ and the main electromagnet relay solenoid $C_1$, which is energised to close the main electromagnet switch $S_5$ energising the main electromagnet 22. This causes the jaws 12 to open and clamp the bag as already explained, at the same time closing the locking switch $S_3$ and safety switch $S_4$. Closure of the locking switch ensures that the solenoid $C_1$ remains energised and the main electromagnet switch $S_5$ remains closed until the release switch $S_6$ is opened. On being energised, the solenoid $C_1$ also throws over the selector switch $S_7$ to its alternative position, thus disconnecting the circuits containing switches $S_8$ and $S_9$ and bringing the switches $S_8^a$ and $S_9^a$ into circuit through the selector switch and the safety switch $S_4$ which is closed by the main electromagnet.

Since the scale-pan 41$^a$ is full and the dump switch $S_9^a$ is closed, the circuit is closed through the scale-pan dump solenoid $C_3^a$ which is therefore energised and opens the bottom door 44$^a$ of the pan 41$^a$, the contents of which are thus dumped into and fall through the hopper 6 and spout 7 (Figures 1 and 2) into the bag.

When the scale-pan is empty, its bottom door 44$^a$ closes and trips the slapper start switch $S_8^a$ momentarily to closed position, momentarily energising the slapper start solenoid $C_2$, which rocks the rocker bar 52 into position 52$^a$ to close the slapper motor relay switch $S_{11}$ thereby energising the slapper motor start solenoid $C_5$ and closing the slapper motor main switch $S_{13}$. The rocker bar is retained in position 52$^a$ by the spring-lock 54, 55, 56 so that the slapper motor main switch remains closed when the momentary energisation of solenoid $C_2$.

The slapper motor 38 runs until the lobe of cam 45 meets the slapper stop switch $S_{10}$ and momentarily trips it to closed position, thereby energising the slapper stop solenoid $C_4$, which pulls the rocker bar 52 out of the spring-lock thereby opening the slapper motor relay switch $S_{11}$, de-energising solenoid $C_5$, opening the slapper motor main switch $S_{13}$ and stopping the slapper motor 38, with the lobe of cam 45 just past the slapper stop switch $S_{10}$. The momentary energisation of solenoid $C_4$ throws the rocker bar 52 into position $52^b$, thereby momentarily closing the bag-release relay switch $S_{12}$ and energising the bag-release relay solenoid $C_6$ to open the bag-release switch $S_6$, which last-mentioned switch is thus opened after a predetermined delay imposed by a retarding device which consists of the cam 45 driven by the slapper motor 38. The circuit through the main electromagnet relay solenoid $C_1$ is thus broken and the armature of this solenoid returns to its initial position opening the main switch $S_5$ and de-energising the electromagnet 22 allowing the jaws 12 to close and release the bag, at the same time opening the safety switch $S_4$ and locking switch $S_3$, while the release of the bag enables the plungers 26 to descend and open the bag-feeler switches $S_1$, $S_2$. Since solenoid $C_4$ is energised only momentarily, the rocker bar 52, being no longer retained by the spring-lock 54, 55, 56, immediately returns to the neutral position allowing switch $S_{12}$ to open again so that solenoid $C_6$ is immediately de-energised and causes or enables the release switch $S_6$ to close once more, but the opening of switches $S_1$, $S_2$, $S_3$ prevents solenoid $C_1$ from being re-energised.

The selector switch is so constructed that the return movement of lever 49 consequent on the de-energisation of solenoid $C_1$ does not throw it over.

The system has therefore returned to its initial state, all circuits being dead, except that the circuits selected by the selector switch have been changed and that switch $S_9{}^a$ is open.

The mechanism of switch $S_7$ may comprise a suitably shaped cam operated by lever 49 through a ratchet drive, which advances the cam at each stroke of the lever 49 through an angle equal to the separation of a high spot from a low spot of the cam, and the cam follower being secured to the arm of the selector switch, one contact of which is closed when the cam-follower is on a high spot of the cam and the other when the follower is on a low spot.

On presenting another empty bag to the spout 7, the aforesaid cycle is repeated, but this time the circuits containing switches $S_8$, $S_9$ are selected by the selector switch on the energisation of solenoid $C_1$, and scale-pan 41 is discharged. During this cycle of operation scale-pan $41^a$ is automatically re-charged in readiness for the next succeeding cycle by means which art not illustrated, since they do not in themselves constitute a part of this invention and are already well known to those skilled in the art of bag filling machinery. When the pan $41^a$ is full, it descends and closes switch $S_9{}^a$. It will be noted that the contents of a scale-pan cannot be dumped unless both switches $S_4$ and $S_9$ or $S_9{}^a$ are closed, so that presentation of a bag to the spout will not cause the contents of the selected scale-pan to be dumped before the pan is full, and dumping cannot take place until the bag is clamped on the spout.

At each cycle, the slapper motor 38 runs for a time predetermined by the speed of the motor and number of revolutions required to rotate the cam 45 through the angle separating the cam lobes, or a complete revolution if the cam has only one lobe; and during this predetermined time the bag remains clamped on the spout. The gear ratio of the cam drive 46 is so selected that the time during which the bag remains clamped and the slapper is in operation is amply sufficient for the discharge of a scale-pan and transfer of its contents to the bag. It is indeed advisable for the operation of the slapper to continue a short while after the bag has received the whole contents of the scale-pan in order to settle the contents of the bag thoroughly.

Figures 5 to 7 illustrate an alternative embodiment of the control system for an installation having two scale units. The mechanical parts of the installation are substantially the same as in the embodiment already described. The spout and bag-clamping mechanism and bag-feeler switch mechanism are as illustrated in, and described with reference to, Figures 1 and 2, but the switch boxes 33 and switch actuating gear 34—37 are dispensed with, the associated switches $S_3$ and $S_4$ being in this second embodiment located on the control panel (Figure 7) and being relay-operated as hereinafter described.

Parts common to the embodiments illustrated in Figures 3 and 4 and in Figures 5 to 7, respectively, are designated by the same reference letters or/and numerals.

In the second embodiment now to be described, of the parts already described with reference to Figures 1 and 2, the electromagnet 22 and its armature 21, the plungers 26, plates 27, levers 30 and switch-boxes 32 are shown diagrammatically in Figure $5b$. Figure $5b$ also shows schematically the following further components of the machine, viz. net weighing apparatus having two similar weighing and dispensing units 58, 59, each comprising a scale-pan 41 or $41^a$, balance beam 42 or $42^a$ and counterweight 43 or $43^a$. The scale-pans have self-closing bottom doors which are diagrammatically represented in Figure $5b$ by the numeral 44, $44^a$, the open position of which is indicated in full lines and the closed position in chain-dotted lines in said figure.

The switches are designated by the letter S, or the letter M, the latter indicating a microswitch, and solenoids or electromagnets by the letter C, each such item being distinguished by an appropriate suffix.

The whole of the switch- and switch-operating gear is conveniently grouped on the control panel (Figures 7 and $5a$) with the exception of the items shown in Figure $5b$ and hereinafter described, viz. the bag-feeler switches $S_1$, $S_2$ contained in the switch-boxes 32 shown in Figures 1 and 2, retarding device starter switches $M_5$, $M_8$, "dump" switches $M_6$, $M_7$, "dump" solenoids $C_3{}^a$, $C_3$, an optionally provided normally closed emergency stop switch $S_{19}$ which is preferably operated by a push-button mounted in a position convenient to the operator who presents the bags to the spout, and an optionally provided slapper-motor relay 70 incorporating a solenoid $C_5$, which, when energised, closes the main switch (not illustrated) in the circuit of a three-phase slapper-driving motor (also not illustrated).

In the preferred construction herein illustrated, the control panel (Figure 7) is provided with a hinged door 71 enclosing the items mounted on the panel and carrying a manually operated scale-selector switch 60 (Figures $5a$, 7) also designated by $S_{20}$ (Figure 6), which is operated by a knob (not illustrated) on the outside of the door. This switch has three positions, viz. "No. 1 scale," "No. 2 scale" and "Both Scales." In either of the first two positions, the circuits controlling and controlled by one or the other of the two weighing and dispensing or "scale" units 58, 59, and the circuits controlling the alternating operation of these units are isolated, and the machine functions as if it has only a single scale unit. In the "Both Scales" position, all the circuits are operative and the scale units are automatically and alternately brought into operation.

On the control panel are mounted the following items: two "scale" relays 61, 62, respectively associated with scale units 58 and 59; a "latched" relay 63; a "latch-release" relay 64; a "main electromagnet" relay 65; two "scale dump" relays 66, 67, respectively associated with scale units 58 and 59, and a "retarder" relay 68 including a pneumatic retarding device 69.

Scale relays 61, 62 comprise solenoids $C_{24}$, $C_{16}$ respectively operating five pole switches $S_{24}{}^a$ to $S_{24}{}^e$ and $S_{16}{}^a$ to $S_{16}{}^e$, all of which switches are normally open except $S_{24}{}^e$ and $S_{16}{}^e$ which are normally closed so that energising of solenoids $C_{24}$ closes switches $S_{24}{}^a$, $S_{24}{}^b$, $S_{24}{}^c$ and $S_{24}{}^d$ and opens switch $S_{24}{}^e$ and similarly energising of solenoid $C_{16}$ closes switches $S_{16}{}^a$ to $S_{16}{}^d$ and opens switch $S_{16}{}^e$.

The latched relay 63 comprises a solenoid $C_{25}$ operating a two-pole switch $S_{25}{}^a$, $S_{25}{}^b$, of which switch $S_{25}{}^a$ is closed and switch $S_{25}{}^b$ is open when the armature 72 of the solenoid is not attracted and conversely. A latch 73, loaded by a spring 74, retains the armature 72 in the attracted position unless the latch-release relay 64 is energised. This relay comprises a solenoid $C_{17}$ whose armature 75 is connected to the latch 73 and when attracted releases the latch from the armature 72 of solenoid $C_{25}$.

The main electromagnet relay 65 comprises a solenoid $C_1$ operating a four-pole switch $S_5{}^a$, $S_5{}^b$, $S_3$, $S_5$, all of which switches are normally open but close when the armature of solenoid $C_1$ is attracted.

The scale dump relays 66, 67 comprise solenoids $C_{14}$, $C_{18}$ respectively operating normally open two-pole switches $S_{14}{}^a$, $S_{14}{}^b$ and $S_{18}{}^a$, $S_{18}{}^b$, which switches close when their respective solenoids are energised.

The retarder relay 68 comprises a solenoid $C_{15}$, whose armature when attracted closes all the normally open switches of a two-pole switch $S_{15}{}^a$, $S_{15}{}^b$, which may optionally have a third pole $S_{15}{}^c$ in the circuit of the slapper motor relay 70. The armature of solenoid $C_{15}$ is also connected by a spring 76 to an element 77 which operates a normally closed switch $S_6$. Element 77 is connected to a pneumatic dashpot constituting the retarding device 69. The dashpot imposes a delay between the attraction of the armature of solenoid $C_{15}$, and the opening of switch $S_6$, and is provided with an adjustable bleed enabling the delay to be set at any predetermined value within the limits of the device. The retarder relay assembly, including the pneumatic dashpot device, is not in itself a part of the present invention, being a known, commercially obtainable article.

For ease in reading the drawings, the conductors which cross the margin of Figure 5a, and are continued in Figure 5b are identified by reference numerals 78 to 95 respectively.

The lower part of Figure 5b shows the optional slapper-motor relay 70 with its solenoid $C_5$ and the bag-feeler switches $S_1$, $S_2$, the main bag-clamping electromagnet $C_7$ and the optional emergency stop switch $S_{19}$, already alluded to. In the upper part of the figure are shown the switches $M_5$ to $M_8$ and solenoids $C_3{}^a$, $C_3$, in addition to the scale pans 41, 41$^a$, balance beams 42, 42$^a$, counterweights 43, 43$^a$, and self-closing doors 44, 44$^a$. The armatures of the dump solenoids $C_3{}^a$ and $C_3$, respectively, operate the bottom doors 44$^a$, 44 of the scale-pans 41$^a$, 41 so as to open the doors and dump the contents of the pans, when the solenoids are energised. Switches $M_5$ and $M_8$ are respectively operated by the bottom doors 44$^a$, 44 of the scale-pans 41$^a$, 41 so as to be momentarily tripped to closed position when the doors close, and switches $M_6$, $M_7$ close when the scale-pans 41$^a$, 41, respectively, are filled and tip the balance beams 42$^a$, 42.

The armatures of all the solenoids are provided with spring return to normal, unattracted position.

The connections of the several switches and solenoids may be best followed by reference to Figure 6. They are connected across two-phase supply mains $L_1$, $L_2$ or across two phases of a three-phase supply. The main electromagnet relay solenoid $C_1$ is in series with the release switch $S_6$ which is normally closed, the emergency stop switch $S_{19}$, if provided, is also normally closed, and two parallel branches, one containing the switch $S_3$, referred to as the "locking" switch, and the other the two series-connected bag-feeler switches $S_1$, $S_2$. The main electromagnet $C_7$ is normally isolated from the mains on both sides by the main relay switches $S_5{}^a$ and $S_5{}^b$, and the dump solenoids $C_3{}^a$, $C_3$ are likewise normally isolated on both sides by the switches $S_{14}{}^a$, $S_{14}{}^b$ and $S_{18}{}^a$, $S_{18}{}^b$.

All the remaining circuits are fed from main $L_1$ through switch $S_5$, referred to as the "safety" switch. One branch from this switch feeds to the moving contact of the scale-selector switch $S_{20}$, and two other branches respectively feed to the dump relay solenoids $C_{14}$, $C_{18}$ through the dump switches $M_6$, $M_7$, and dump relay switch isolator switches $S_{24}{}^c$ and $S_{16}{}^c$, while yet two other branches feed to the retarder relay solenoid $C_{15}$ through retarder relay starter switches and retarder relay isolator switches $M_5$, $S_{24}{}^d$ and $M_8$, $S_{16}{}^d$, respectively. Switches $M_5$, $M_8$ are also respectively paralleled with retarder relay maintaining switches $S_{15}{}^a$ and $S_{15}{}^b$.

When the scale-selector switch $S_{20}$ is in either of the "one scale only" selecting positions, one of the two pairs of circuits respectively containing the switches $M_5$, $M_6$ and the switches $M_7$, $M_8$, is fed direct through fixed contacts 96, 97 or 98, 99 of the scale-selector switch, the associated pair of isolator switches $S_{24}{}^c$, $S_{24}{}^d$, or $S_{16}{}^c$, $S_{16}{}^d$ being short-circuited, while the other such pair of circuits remains isolated by the other pair of normally open isolator switches $S_{16}{}^c$, $S_{16}{}^d$ or $S_{24}{}^c$, $S_{24}{}^d$. These isolator switches can only close when the moving contact of the scale-selector switch is in the "Both Scales" position in which it feeds through a fixed contact 100 to one or other of the scale relay solenoids $C_{24}$, $C_{16}$, by which these switches are operated.

If a slapper-motor is provided, a further branch from the safety switch $S_5$ feeds its relay solenoid $C_5$ through the switch $S_{15}{}^c$.

Fixed contact 100 feeds to several parallel branches. One branch feeds to the latched relay solenoid $C_{25}$ through the latched relay feed switch $S_{24}{}^a$; another to the latch-release relay solenoid $C_{17}$ through the latched release relay feed switch $S_{16}{}^a$; while others feed to the scale relay solenoids $C_{24}$ and $C_{16}$ respectively. Each of these solenoids is fed through two parallel branches, one containing the series-connected scale relay isolator switch $S_{16}{}^e$ or $S_{24}{}^e$ which are normally closed and the scale relay feed switch $S_{25}{}^a$ or $S_{25}{}^b$, and the other containing the scale relay maintaining switch $S_{24}{}^b$ (or $S_{16}{}^b$).

The solenoids $C_1$, $C_{15}$, $C_{24}$, $C_{25}$, $C_{14}$, $C_5$, $C_{16}$, $C_{17}$ and $C_{18}$ are all paralleled onto the main $L_2$.

The sequence of operations when the scale-selector switch is in the "Both Scales" position, with its moving contact on fixed contact 100, is as follows:

Initially all switches are open except the release switch $S_6$, the optional emergency stop switch $S_{19}$, the scale relay isolator switches $S_{24}{}^e$, $S_{16}{}^e$, and one or other of the scale relay feed switches $S_{25}{}^a$ and $S_{25}{}^b$, according to whether the armature 72 of the latched relay solenoid $C_{25}$ is or is not latched in the attracted position. Let it be assumed that the armature is not so latched and is in the "normal" unattracted position, so that switch $S_{25}{}^a$ is closed and switch $S_{25}{}^b$ is open.

One or both of the dump switches $M_6$, $M_7$ may also be closed depending on whether the scale-pans 41, 41$^a$ are full or empty. If both scale-pans are filled, which may be assumed to be the case when the machine is started up, both switches $M_6$, $M_7$ will be closed.

On presenting an empty bag squarely to the spout 7 (Figures 1 and 2), the plungers 26 are raised, closing the bag-feeler switches $S_1$, $S_2$ as already explained, and completing the circuit through the release switch $S_6$ and the main electromagnet relay solenoid $C_1$, which switch is energised to close the main electromagnet switches $S_5{}^a$ and $S_5{}^b$, thus energising the main electromagnet $C_7$. This causes the jaws 12 (Figures 1 and 2) to open and clamp the bag as already explained. At the same time, solenoid $C_1$ closes the locking switch $S_3$ and safety switch $S_5$. Closure of the locking switch ensures that the solenoid $C_1$ remains energised and the main electromagnet switches $S_5{}^a$ and $S_5{}^b$ remain closed until the release switch $S_6$ is opened.

On closure of the safety switch $S_5$, the circuits fed through the fixed contact 100 of the scale-selector switch are energised, and since the scale relay feed and isolator switches $S_{25}{}^a$ and $S_{16}{}^e$ are both closed, the scale relay solenoid $C_{24}$ is energised and closes switches $S_{24}{}^a$, $S_{24}{}^b$, $S_{24}{}^c$ and $S_{24}{}^d$ and opens switch $S_{24}{}^e$. Closure of switch $S_{24}{}^c$ completes the circuit through dump switch $M_6$ to dump relay solenoid $C_{14}$, which closes switches $S_{14}{}^a$ and $S_{14}{}^b$, and energises dump solenoid $C_3{}^a$. This opens the door 44$^a$ of pan 41$^a$ and dumps the contents of scale 58 through the hopper 6 and spout 7 (Figures 1 and 2) into the bag, while the dump relay solenoid $C_{18}$ associated with the other scale 59 remains isolated by its isolator switch $S_{16}{}^c$. As soon as the contents of the scale have been dumped, the pan rises and releases the dump switch $M_6$, breaking the circuit through the dump relay solenoid $C_{14}$ and opening the switches $S_{14}{}^a$, $S_{14}{}^b$ to break the circuit through the dump solenoid $C_3{}^a$ and allow the door 44$^a$ to close. Closure of the retarder isolating switch $S_{24}{}^d$ puts the retarder starting switch $M_5$ in circuit, and when the door 44$^a$ closes, switch $M_5$ is tripped and closes momentarily, and energises the retarder starting solenoid $C_{15}$, which loads-up the spring 76 of the retarding device 69 and closes the retarder relay maintaining switches $S_{15}{}^a$ and $S_{15}{}^b$, the latter being isolated by the retarder isolating switch $S_{16}{}^d$. Closure of switch $S_{15}{}^a$ maintains the circuit through solenoid $C_{15}$ notwithstanding that switch $M_5$ opens again immediately after being tripped. If a slapper of the preferred or conventional type referred to above is provided, solenoid $C_{15}$, on being energised, also closes switch $S_{15}{}^c$ thus energising the solenoid $C_5$ of the slapper-motor relay 70 to close the main switch of the motor circuit. Closure of switch $S_{24}{}^a$ energises the latched relay solenoid $C_{25}$ which attracts its armature 72 thus opening switch $S_{25}{}^a$ and closing switch $S_{25}{}^b$. Opening of switch $S_{25}{}^a$ breaks the circuit to solenoid $C_{24}$ through switch $S_{16}{}^e$, but closure of switch $S_{24}{}^b$ maintains the feed to solenoid $C_{24}$ through the parallel branch, thus keeping switches $S_{24}{}^a$, $S_{24}{}^b$, $S_{24}{}^c$ and $S_{24}{}^d$ closed and switch $S_{24}{}^e$ open.

After an interval predetermined by the setting of the bleed adjustment of the penumatic dashpot retarding device 69, the element 77 opens the release switch $S_6$, thus breaking the circuit through the main relay solenoid $C_1$ and opening switches $S_5{}^a$, $S_5{}^b$, $S_3$ and $S_5$. Opening of switches $S_5{}^a$, $S_5{}^b$ deenergises the main electromagnet $C_7$ and thereby releases the bag, allowing the bag-feeler switches $S_1$, $S_2$ to open. Opening of the locking switch $S_3$ terminates the short-circuiting of the bag-feeler switches, putting them in readiness for the next operation, and opening of the safety switch $S_5$ opens the previously closed relay circuits containing the relay solenoids $C_{15}$, $C_{24}$, $C_{25}$, and $C_5$, if present. The last-named solenoid therefore allows the slapper-motor switch to open and stop the motor. De-energising of solenoid $C_{24}$ allows switches $S_{24}{}^a$, $S_{24}{}^b$, $S_{24}{}^c$ and $S_{24}{}^d$ to open and switch $S_{24}{}^e$ to close again, restoring the status quo ante.

However, de-energising of solenoid $C_{25}$ does not close switch $S_{25}{}^a$ and open switch $S_{25}{}^b$ because its armature 72 has been trapped and retained by the spring-loaded latch 52. Consequently, when the next bag is presented to the spout, solenoid $C_{24}$ remains isolated by switch $S_{25}{}^a$ and solenoid $C_{16}$ is energised instead through switches $S_{24}{}^e$ and $S_{25}{}^b$. Switches $S_{24}{}^a$, $S_{24}{}^b$, $S_{24}{}^c$, $S_{24}{}^d$ therefore remain open, and switch $S_{24}{}^e$ closed, while switches $S_{16}{}^a$, $S_{16}{}^b$, $S_{16}{}^c$, $S_{16}{}^d$ close and switch $S_{16}{}^e$ opens. The circuits containing the switches $M_7$, $M_8$ are therefore connected through switches $S_{16}{}^c$ and $S_{16}{}^d$, respectively, switches $M_5$, $M_6$ being isolated. Consequently, the other scale 59 now discharges its contents and on completion of the discharge causes the retarding device 69 to be started by the closure of switch $M_8$ by door 44. During this process, the pan 41$^a$ of scale 58 fills up again and, when said pan is full, re-closes switch $M_6$ in readiness for the next cycle. The mechanism for recharging the scales, not being a part of the present invention and being of known type, is not illustrated.

Closure of switch $S_{16}{}^a$ energises the latch-release relay solenoid $C_{17}$, which releases the latch 52 from the armature 72 of solenoid $C_{25}$ and allows switch $S_{25}{}^b$ to open and switch $S_{25}{}^a$ to close, but opening of switch $S_{25}{}^b$ does not break the circuit through solenoid $C_{16}$, this circuit being maintained by closure of switch $S_{16}{}^b$, and opening of switch $S_{16}{}^e$ keeps solenoid $C_{24}$ isolated notwithstanding the closure of switch $S_{25}{}^a$.

When the retarding device 69 has again opened the release switch $S_6$, the system returns to its initial state with switch $S_{25}{}^a$ closed and switch $S_{25}{}^b$ open. Switch $M_6$ is now closed and switch $M_7$ opened, and as the operating cycle is repeated thereafter, these switches open and close alternately as the pans 41$^a$, 41 of the scales 58, 59 fill and descend.

It will be noted that the contents of a scale cannot be dumped unless both switches $S_5$, and $M_6$ or $M_7$ are closed, so that presentation of a bag to the spout will not cause the contents of either scale to be dumped before its pan is full. Dumping of the scales cannot take place until a bag is clamped on the spout. Simultaneous dumping of the contents of both scales is prevented by the dump-switch isolator switches $S_{24}^c$ and $S_{16}^c$, both of which cannot be closed at the same time since energising of either scale relay solenoid $C_{24}$ or $C_{16}$ isolates the other of said scale relay solenoids by opening switch $S_{24}^e$ or $S_{16}^e$.

If the scale-selector switch $S_{20}$ is placed in one or other of the "one-scale only" positions, closure of the bag-feeler switches $S_1$, $S_2$ energises solenoid $C_1$, closing switches $S_5^a$ and $S_5^b$ and energising the electromagnet $C_7$, and closing switches $S_3$, $S_5$ as before. Under these conditions, switch $S_5$ feeds direct through contacts 96, 97 or 98, 99 to switches $M_5$, $S_{15}^a$ and $M_6$, or $M_8$, $S_{15}^b$ and $M_7$. If the contacts 96, 97 are selected, switch $M_6$ closes when scale 58 is filled and energises solenoid $C_{14}$, which closes switches $S_{14}^a$, $S_{14}^b$ and energises solenoid $C_3^a$ to dump the contents of the scale. When door $44^a$ closes, it trips switch $M_5$, energises solenoid $C_{15}$, and starts the retarding device 69, which after the predetermined delay opens the release switch $S_6$ and restores the system to its initial state in readiness for another cycle, the circuit through solenoid $C_{15}$ being maintained by closure of switch $S_{15}^a$ by solenoid $C_{15}$. If contacts 98, 99 are selected, a similar cycle takes place with the substitution in the foregoing explanation of items $M_7$, 59, $C_{18}$, $S_{18}^a$, $S_{18}^b$, $C_3$, 44, and $M_8$ for $M_6$, 58, $C_{14}$, $S_{14}^a$, $S_{14}^b$, $C_3^a$, $44^a$, and $M_5$, respectively.

Figure 8 illustrates a modification of the circuit diagram of Figure 6 for operating a machine with three scale units. The modifications include the provision of an additional dump solenoid $C_3^b$, an additional dump switch $M_9$, and dump relay $C_{23}$, $S_{23}^a$, $S_{23}^b$, an additional retarder-starting switch $M_{10}$, a pair of additional fixed contacts 80, 81 in the scale selector switch $S_{20}$ feeding direct to switches $M_9$, $M_{10}$, respectively, an additional scale-selecting relay $C_{21}$, $S_{21}^a$, to $S_{21}^e$, and a modified latched-relay assembly $C_{25}$, $C_{17}$, $C_{22}$, $S_{25}$, $S_{17}$, $S_{22}$. In the latter assembly (see Figure 9), solenoid $C_{25}$ operates a single-pole switch $S_{25}$, and single-pole switches $S_{17}$, $S_{22}$ are similarly operated by solenoids $C_{17}$, $C_{22}$ respectively, all three switches being normally open and closed by the solenoids when said solenoids are energised. The armature 72, $72^b$, $72^c$ of each of these solenoids has a separate spring-loaded latch $73^a$, $74^a$; $73^b$, $74^b$; $73^c$, $74^c$ and each latch is tripped by the armature of the next succeeding, cyclically adjacent solenoid when said solenoid is energised. For convenience of the schematic view (Figure 9), latch $73^c$ is shown as made of two parts $73^c$, $73^{cc}$ which parts are connected by a link $73^x$.

The cyclical operational sequence is as follows:

When solenoid $C_{24}$ is energised, it closes switches $S_{24}^a$ to $S_{24}^d$ and opens switch $S_{24}^e$. Closing of switch $S_{24}^a$ energises solenoid $C_{17}$ to close switch $S_{17}$, which latches, and to unlatch switch $S_{25}$, which opens.

Similarly, when solenoid $C_{16}$ is energised, it closes switches $S_{16}^a$ to $S_{16}^d$ and opens switch $S_{16}^e$. Closing of switch $S_{16}^a$ energises solenoid $C_{22}$ to close and latch switch $S_{22}$ and to unlatch and open switch $S_{17}$, while energising of solenoid $C_{21}$ closes switches $S_{21}^a$ to $S_{21}^d$ and opens switch $S_{21}^e$. Closing of switch $S_{21}^a$ causes solenoid $C_{25}$ to close and latch switch $S_{25}$ and to unlatch and open switch $S_{22}$.

In each case when a scale-relay solenoid $C_{24}$, $C_{16}$ or $C_{21}$ is energised, its feed switch $S_{25}$, $S_{17}$ or $S_{21}$ opens and its maintaining switch $S_{24}^b$, $S_{16}^b$ or $S_{21}^c$ closes, while the feed switch $S_{17}$, $S_{21}$ or $S_{25}$ of the next cyclically adjacent scale-relay is closed and latched in readiness for the next cycle of operation, but this scale-relay is isolated till the safety switch $S_5$ opens by the opening of its cross-connected isolator switch $S_{16}^e$, $S_{21}^e$ or $S_{24}^e$.

In all other respects the circuit is similar in arrangement and operation to that shown in Figures 5 and 6 except that only one retarding-relay-maintaining switch $S_{15}$ is provided, this switch being fed directly from the safety switch $S_5$.

Any machine in accordance with this invention may, in accordance with the usual practice, be provided with a short conveyor to receive each filled bag when released from the filling spout and to transfer it to a machine for sewing up or otherwise closing the bag-mouth.

I claim:

1. A bag-filling machine comprising a filling spout to which open mouthed bags may be applied in succession with the walls of said bag embracing the outer walls of said spout; bag-clamping means movable toward and from the outer walls of said spout to bag-clamping and bag-releasing positions, respectively; an electric circuit; a bag-feeler switch in said circuit; means actuated by the application of a bag to said spout to close said bag-feeler switch; an electrically controlled power device under the control of said bag-feeler switch, which, when said bag-feeler switch is closed, moves the bag-clamping means to bag-clamping position, and which, when the circuit which includes said bag-feeler switch is opened, releases the bag-clamping means; a locking switch in said circuit in parallel with said bag-feeler switch; means for closing said locking switch when said bag-clamping means is moved to bag-clamping position by said power means; a normally closed release switch in said circuit in series with said bag-feeler and locking switches; and means including a retarding device operative after a predetermined delay to open said release switch to open the circuit including said bag-feeler switch and said locking switch and thereby effect release of the bag-clamping means and release of the bag from said filling spout.

2. A bag-filling machine as defined in claim 1, including a plurality of bag-feeler switches connected in series in said circuit so that all of said switches must be closed to effect movement of said bag-clamping means to bag-clamping position, and wherein the means actuated by the application of a bag to said spout includes independent means for closing each of said bag-feeler switches.

3. A bag-filling machine as defined in claim 1, wherein the means which opens the release switch includes a device for causing said release switch to open momentarily and thereafter to close again to put the circuit in readiness for another cycle of operation of the bag-filling machine.

4. A bag-filling machine as defined in claim 1, including a slapper for striking said bag to settle the contents thereof, and an electric motor in said circuit for operating said slapper.

5. A bag-filling machine as defined in claim 1, including a slapper for striking said bag to settle the contents thereof, an electric motor in said circuit for operating said slapper, and means for stopping said motor, operation of said last mentioned means being determined by the same means which determines the opening of said release switch.

6. A bag-filling machine as defined in claim 1, including a constant speed motor in said circuit for driving said retarding device, a switch in said circuit which, when closed, starts said electric motor, and a safety switch in said circuit actuated by said electrically controlled power device to circuit closing position only when a bag is clamped on said spout by said bag-clamping means.

7. A bag-filling machine as defined in claim 1, including a circuit for starting the operation of said retarding device, a starter switch in said starting circuit, and a safety switch in said starting circuit coupled to said locking switch to close concurrently therewith and thereby render said starter switch capable of starting the retarding device only when a bag is clamped on said spout by said bag-clamping means.

8. A bag-filling machine as defined in claim 7, including weighing and dispensing apparatus for supplying material to said spout, an electric switch in said circuit for controlling discharge of said apparatus, and wherein the safety switch controls the circuit controlled by said last mentioned electric switch as well as the starting circuit of the retarding device, whereby the material from said weighing and dispensing apparatus can be discharged to said spout only when the bag-clamping means is actuated to bag-clamping position.

9. A bag-filling machine as defined in claim 8, wherein the weighing and dispensing apparatus includes a scale pan occupying an upper position when empty and a lower position when full, and wherein the said circuit includes a dump switch in series with said safety switch, said dump switch being operable by said scale pan to circuit closing position only when said scale pan is full of material and has moved to its lower position.

10. A bag-filling machine as defined in claim 9, wherein the scale pan includes a discharge door, and wherein the starter switch of the retarding device in series with said safety switch is momentarily closable by closing of said discharge door following discharge of the material from said scale pan to start the retarding device only when said safety switch is in circuit closing position.

11. A bag-filling machine as defined in claim 10, including a plurality of scale pans each with its associated discharge door and dump switch, a separate circuit connected to each dump switch, automatic selector switch means and actuating means therefor operative to select each of said separate circuits in turn for connection to the safety switch on movement of the bag-clamping means to bag-clamping position by the power means.

12. A bag-filling machine as defined in claim 11, including a starter switch associated with each scale pan and momentarily closable by the discharge door thereof on its return to closed position after discharging the contents of the scale pan, a separate circuit connected to the retarding device through each of said starter switches, the automatic selector switch means being operative to connect each of the last-named circuits selectively in turn to the safety switch on movement of the bag-clamping means to bag-clamping position by the power means.

13. A bag-filling machine as defined in claim 1, the retarding device including a release-switch-operating relay and a spring-loaded pneumatic dashpot.

14. A bag-filling machine as defined in claim 1, including a circuit for starting the operation of said retarding device, a starter switch in said starting circuit, means for momentarily closing said starter switch, a normally open maintaining switch in parallel with said starter switch, a relay in said starting circuit which actuates the retarding device and closes the maintaining switch to short-circuit the starter switch on closure of the latter to keep said relay energised, and a safety switch controlling the starting circuit in series with the starter switch and the maintaining switch, said safety switch being coupled to the said locking switch to open concurrently therewith and thereby allow the retarding device to return to its initial state and close the release switch in readiness for another operative cycle when the bag-clamping means are moved to bag-releasing position by the power means.

15. A bag-filling machine as defined in claim 1, including a circuit controlling the retarding device, a normally open safety switch in said circuit, a normally open switch controlling the bag-clamping power means and a relay energised by the circuit containing the bag-feeler, locking and release switches to close the power-means-controlling switch and thereby move the bag-clamping means to bag-clamping position and concurrently to close the locking and safety switches, the relay being deenergised when the release-switch is opened to open the locking, safety and power-means-controlling switches.

16. In a bag-filling machine, a filling spout to which open mouthed bags may be applied in succession with the walls of said bag in contact with the outer walls of said spout; bag-clamping means movable toward and from the outer walls of said spout to bag-clamping and bag-releasing positions, respectively; an electric circuit; a bag-feeler switch in said circuit; means actuated by the application of a bag to said spout to close said bag-feeler switch; an electrically controlled power device under the control of said bag-feeler switch, which, when said bag-feeler switch is closed, moves the bag-clamping means to bag-clamping position and which, when the circuit which includes said bag-feeler switch is opened, releases the bag-clamping means; a constant speed electric motor in said circuit for opening the said circuit which includes said bag-feeler switch to thereby effect release of said bag-clamping means and release of the bag from said filling spout; a switch in said circuit for controlling said motor; a cam driven by said motor; a relay solenoid in said circuit; and a switch in said circuit for controlling said relay solenoid, rotation of said cam after a predetermined number of revolutions of said motor momentarily closing the switch which controls said relay solenoid to open the switch which controls said motor to stop said motor after a predetermined number of revolutions thereof.

17. A bag-filling machine comprising a filling spout to which open-mouthed bags may be applied in succession with the walls of said bag embracing said spout; bag-clamping means movable to bag-clamping and bag-releasing positions, respectively; an electric circuit; a bag-feeler switch in said circuit; means actuated by the application of a bag to said spout to close said bag-feeler switch; an electrically controlled power device under the control of said bag-feeler switch, which device, when said bag-feeler switch is closed, moves the bag-clamping means to bag-clamping position, and releases the bag-clamping means for movement to bag-releasing position when said circuit including said bag-feeler switch is opened; a normally closed release switch in said circuit in series with said bag-feeler switch; means including a retarding device operative after a predetermined delay to open said release switch and thereby cause the bag-clamping means to release the bag from said spout; a plurality of weighing and dispensing apparatus for supplying material to said spout, each such set including a scale-pan; an electric circuit controlling the dumping of the contents of each scale pan into the spout, a normally open dump isolator switch in said last-named circuit; a selector relay associated with each scale-pan, a feed switch for said relay, a normally closed relay isolating switch in series with said feed switch, and a normally open relay maintaining switch short-circuiting said relay feed switch when closed, said relay when energised closing the dump isolator switch of the associated scale-pan, its own maintaining switch and the selector relay feed switch associated with the next scale-pan to be dumped, and opening the relay isolating switch associated with said last-named scale pan and its own feed switch; and latching means operative to retain all the relay feed switches in the positions brought about by the energisation of any of said relays, after such energisation has ceased, until the next of said relays is energised.

18. A bag-filling machine as defined in claim 17, including a system of latched relays actuating the selector relay feed switches and a normally open latched relay feed switch actuated by each selector relay and moved to closed position when such selector relay is energised to cause the latched relay system to open the feed switch of such selector relay and close the feed switch of the next selector relay to be energised.

19. A bag-filling machine as defined in claim 17, including a manually operable emergency switch for opening all circuits simultaneously and thereby stopping the operation of the machine and releasing from the filling spout a bag clamped thereon.

20. A bag-filling machine comprising a filling spout to which open-mouthed bags may be applied in succession with the walls of said bag embracing said spout; bag-clamping means movable to bag-clamping and bag-releasing positions, respectively; an electric circuit; a bag-feeler switch in said circuit; means actuated by the application of a bag to said spout to close said bag-feeler switch; an electrically controlled power device under the control of said bag-feeler switch, which device, when said bag-feeler switch is closed, moves the bag-clamping means to bag-clamping position, and releases the bag-clamping means for movement to bag-releasing position when said circuit including said bag-feeler switch is opened; a normally closed release switch in said circuit in series with said bag-feeler switch; means including a retarding device operative after a predetermined delay to open said release switch and thereby cause the bag-clamping means to release the bag from said spout; a plurality of weighing and dispensing apparatus for supplying material to said spout, each such set including a scale-pan; an electric circuit controlling the dumping of the contents of each scale pan into the spout, a normally open dump isolator switch in said last-named circuit; a starting circuit associated with each scale pan, closure of which circuit initiates the operation of the retarding device, a starter switch in said starting circuit actuated by the associated scale pan on dumping of its contents, and a normally open retarder isolator switch in said starting circuit in series with said starter switch; a selector relay associated with each scale-pan, a feed switch for said relay, a normally closed relay isolating switch in series with said feed switch, and a normally open relay maintaining switch short-circuiting said relay feed switch when closed, said relay when energised closing the dump and retarder isolator switches of the associated scale-pan, its own maintaining switch and the selector relay feed switch associated with the next scale-pan to be dumped, and opening the relay isolating switch associated with said last-named scale pan and its own feed switch; and latching means operative to retain all the relay feed switches in the positions brought about by the energisation of any of said relays, after such energisation has ceased, until the next of said relays is energised.

21. A bag-filling machine as defined in claim 20, including a manual selector switch movable to selectable positions for selectively connecting the dump-controlling and starting circuits associated with a selected scale-pan directly to the supply, and at the same time short-circuiting the dump- and retarder-isolator switches of the said selectively connected circuits and all of the selector relays.

22. A bag-filling machine as defined in claim 21 including a safety switch in the connection to the supply of said manual selector switch and means for closing and opening said safety switch when the bag-clamping means is moved to bag-clamping and bag-releasing position respectively.

23. A bag-filling machine as defined in claim 22, including a control panel on which are grouped the selector relays, the latched relays, the retarding device and release switch actuated thereby, the manual selector switch, the safety switch, a locking switch in parallel with the bag-feeler switch, a switch controlling the bag-clamping power device, a relay in circuit with the bag-feeler and locking switches and actuating the locking switch, the safety switch and the power device-controlling switch to close said last-named switches concurrently on closure of the bag-feeler switches.

24. A bag-filling machine as defined in claim 23, including a relay in each of said electric circuits controlling the dumping of the contents of said scale-pans, a switch actuated by said relay, a circuit containing said last-named switch and a solenoid in said last-named circuit operative to dump the contents of its associated scale-pan, said last-named relays and switches being grouped on said control panel.

FRANK ARNOLD ROWLAND.

No references cited.